United States Patent
Burk

[15] 3,680,681
[45] Aug. 1, 1972

[54] BELT CONVEYOR UNLOADING DEVICE

[72] Inventor: Snell G. Burk, Golden, Colo.

[73] Assignee: American Metal Climax, Inc., New York, N.Y.

[22] Filed: Oct. 19, 1970

[21] Appl. No.: 81,783

[52] U.S. Cl. ..................................................198/187
[51] Int. Cl. ................................................B65g 15/28
[58] Field of Search......................198/184–185, 187, 198/192, 230

[56] References Cited

UNITED STATES PATENTS 2,647,619  8/1953  Green...........................198/230

FOREIGN PATENTS OR APPLICATIONS 1,131,901  10/1968  Great Britain................198/187

Primary Examiner—Edward A. Sroka
Attorney—Kasper T. Serijan and Eugene J. Kalil

[57] ABSTRACT

Apparatus for selectively removing bulk material from a moving conveyor comprises means located along the conveyor between the loading point and head pulley, which, when operated, raises the longitudinal intermediate region of the conveyor above its side regions at any one of a group of selected stations along the conveyor, thereby to cause material carried on the conveyor to be discharged at a selected station.

9 Claims, 10 Drawing Figures

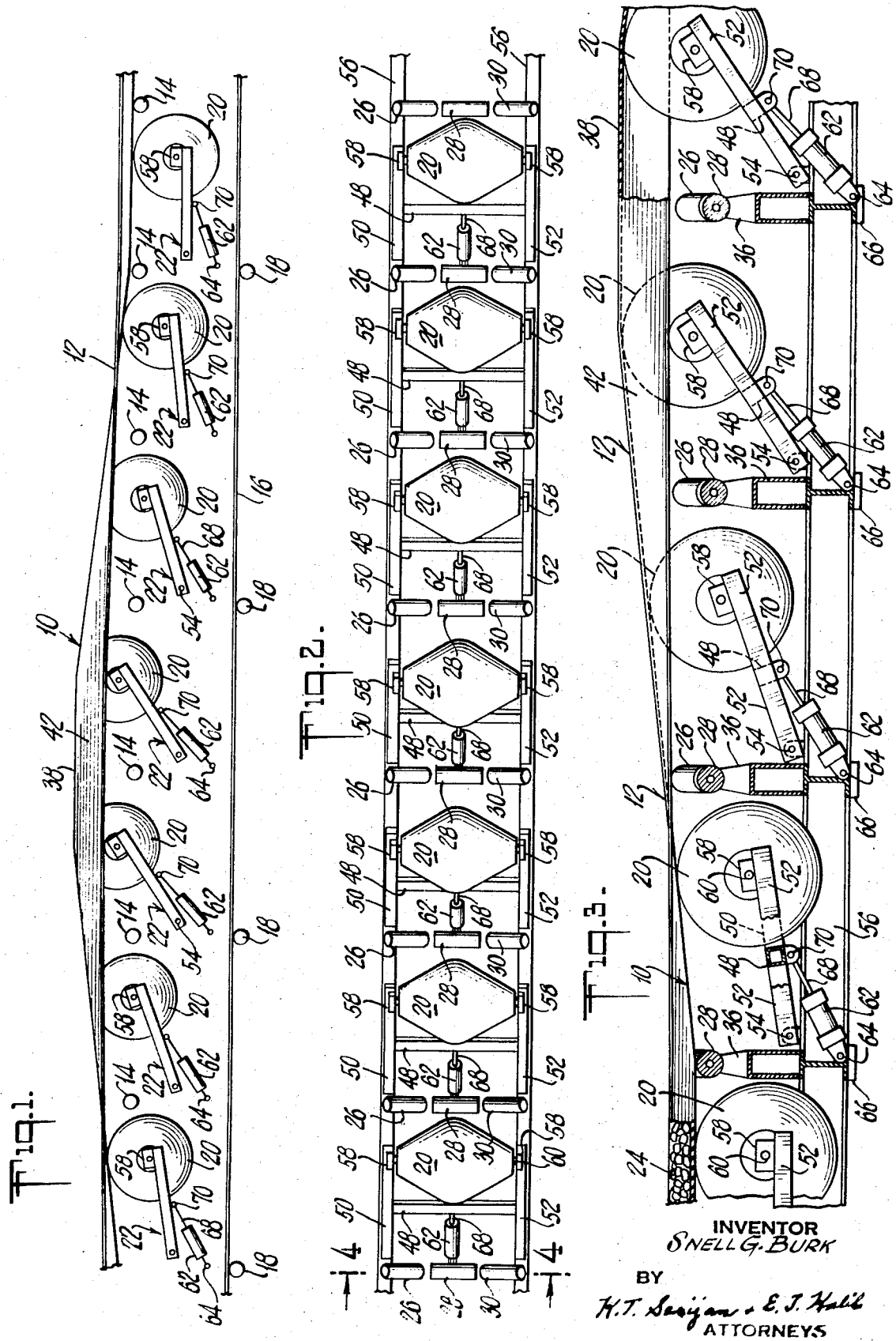

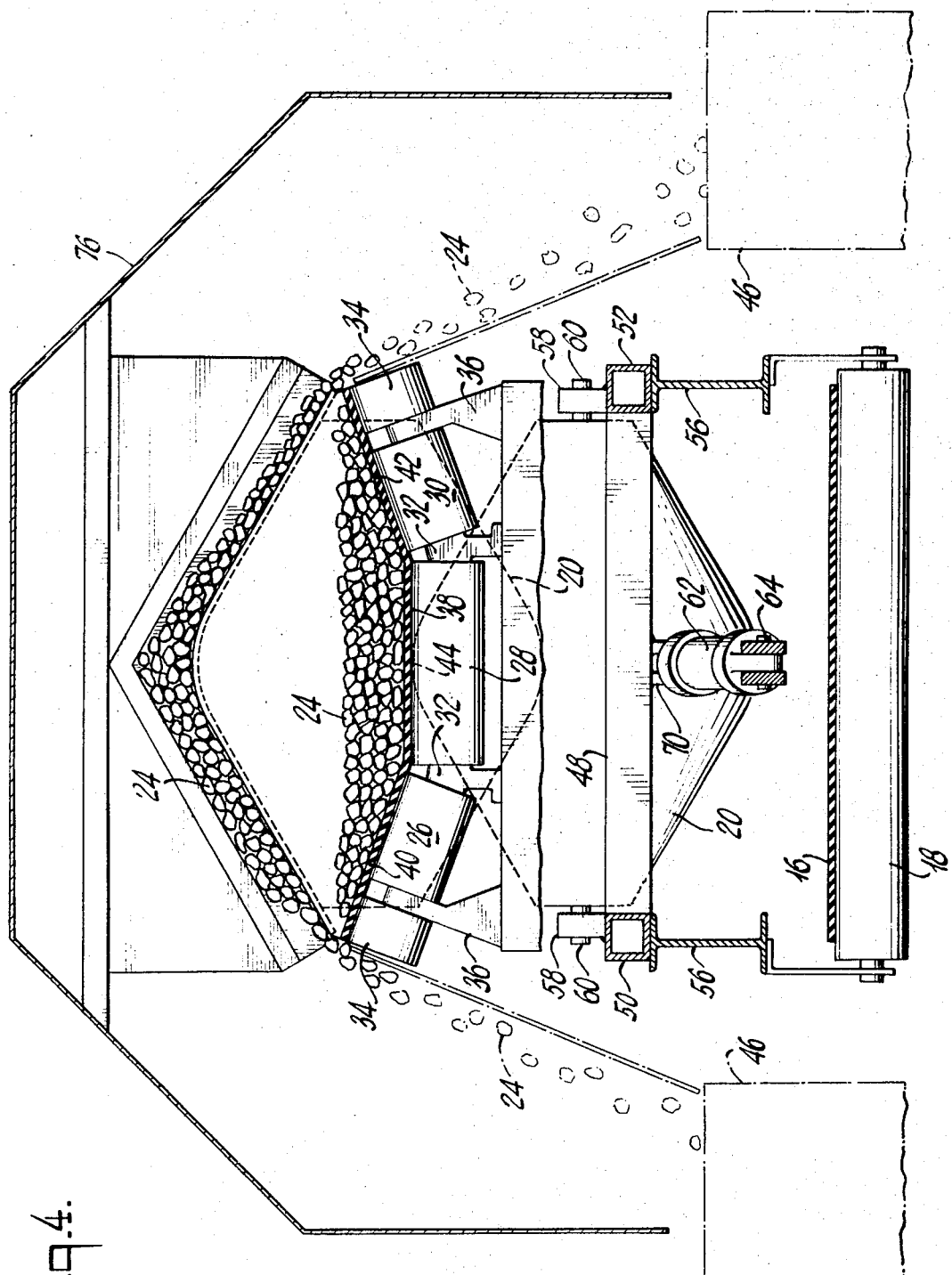

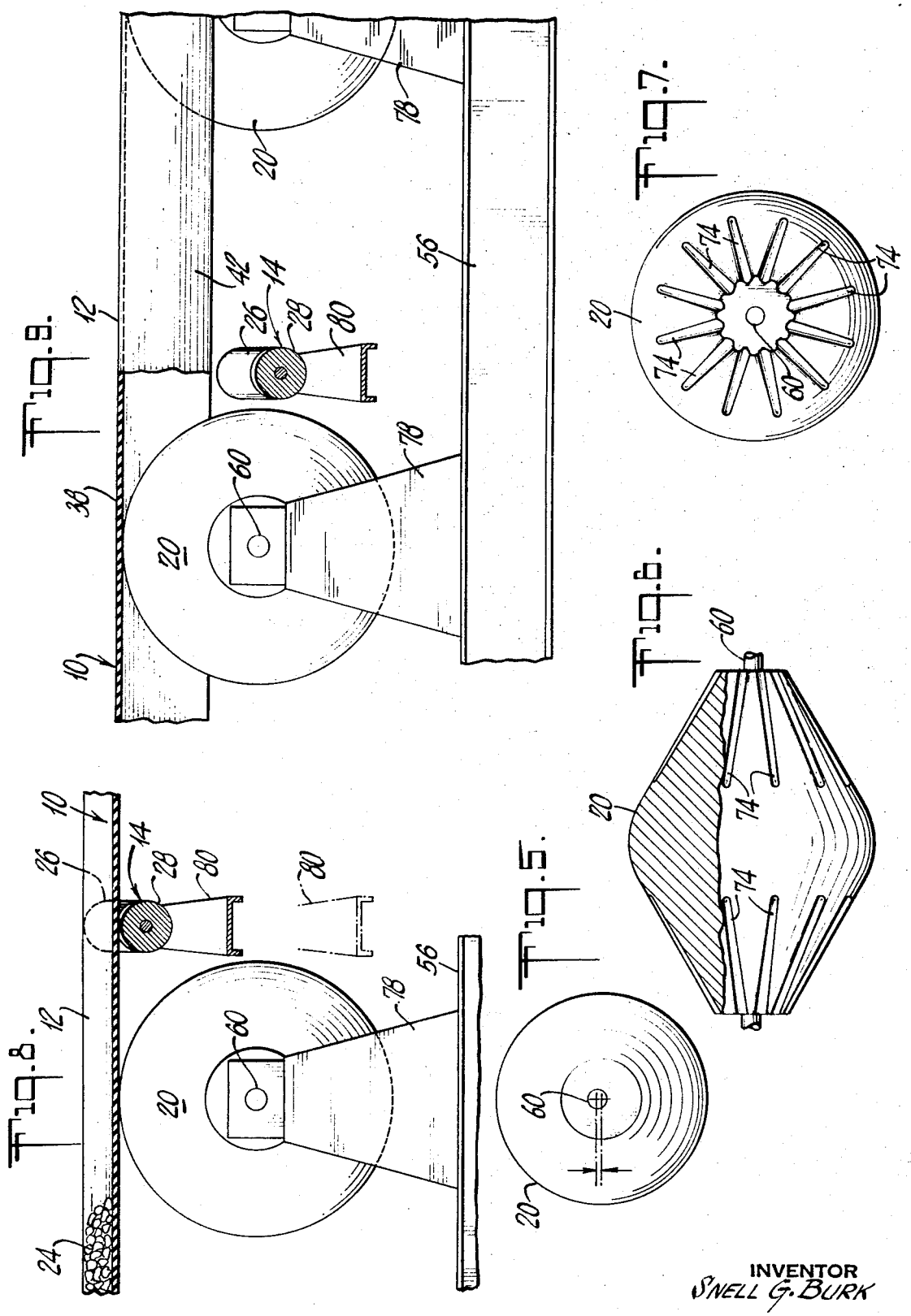

BELT CONVEYOR UNLOADING DEVICE

The present invention relates generally to conveyors, and more particularly to an apparatus for achieving selective discharge of bulk material from a moving conveyor.

In many applications of conveyors such as those utilized in mines and foundries, bulk material on the conveyor must be removed or discharged from the moving conveyor at one or more selected discharge or unloading stations located along the path of the conveyor between the loading point and the head pulley.

In the known belt conveyors, selective intermediate discharge may be accomplished through the use of plows or scrapers located at the desired discharge stations to intercept the load on the moving belt conveyor when actuated. The more common approach to the discharge of material from a moving belt conveyor involves the use of fixed or movable trippers. A tripper generally includes a pair of pulleys mounted on a frame at each intermediate discharge station. The pulleys, which may derive their motive power from the conveyor belt, cause the belt to move upwards along an incline to an elevated discharge point defined by one of the pulleys. Discharge at that point is effected much in the manner as material discharge from a head pulley into a suitable receptacle. The second pulley in the tripper redirects or snubs the belt conveyor back under the inclined plane and repositions the conveyor onto its normal horizontal run. In a movable tripper the pulleys are mounted on a carriage that is movable along the path of the conveyor.

The disadvantages of the use of plows or scrapers for performing selective intermediate discharge from a moving conveyor arise from the fact that the operation of these devices places an excessive wear on the material of the conveyor belt, and in addition may cause the belt to become misaligned. As a result, the conveyor system must be periodically shut down for belt replacement or realignment.

The use of trippers also presents serious disadvantages and potential operating difficulties including the requirement for additional apparatus and driving power to carry the material up the incline, and of additional costly and bulky structure to support the pulleys, idlers and chutes. In addition, the use of trippers significantly increases the wear on the conveyor belt surface wherever material is fed back on the belt, and the repeated reverse bending of the belt tends to separate the plies of the belt.

The use of discharge trippers also requires additional costly equipment such as chutes, liners, gates and actuating mechanisms. The movable tripper, which in many applications is preferable to the stationary tripper, has in addition to those disadvantages of the stationary tripper, the further limitation that it requires the use of additional mechanical devices such as track supports, rails, flanged wheels, bearings, brakes, speed reducers, sprocket or gear drives, drive motor and controls, and moving power collecting devices.

The need for these additional mechanical devices significantly increases the cost and complexity and thus the likelihood of mechanical problems of the material discharging apparatus heretofore in use. A further drawback of the known intermediate conveyor discharge apparatus is the difficulty in adapting the discharge mechanism for automated control by means of which material can be automatically discharged from the conveyor belt in accordance with a predetermined sequence or program.

It is an object of the present invention to provide a simplified and more reliable apparatus for achieving selective discharge from a moving conveyor at intermediate locations or discharge stations along the conveyor path.

It is a further object of the present invention to provide a conveyor discharge apparatus which is readily amenable to automated control.

It is another object of the present invention to provide a conveyor discharge apparatus in which the wear on the conveyor belt is significantly reduced during discharge operations.

It is yet a further object of the invention to provide an apparatus of the type described in which the discharge mechanism when in its inoperative position, contributes to the normal drive operation of the conveyor.

It is still a further object of the invention to provide a material discharge apparatus for use with a moving conveyor belt in which substantially all of the material is removed from the belt wherever the discharge mechanism is operated.

Broadly considered, the selective discharge apparatus of the invention comprises a series of discharge members positioned between the head pulley and loading point of the conveyor at those selected locations or stations at which material discharge from the conveyor may be desired. To discharge material from the moving conveyor, a selected discharge member is caused to move vertically relative to the conveyor belt to raise the longitudinal central region of the belt above its sides, to thereby define sloping side surfaces extending from the raised central region to the side regions of the belt. In this configuration of the conveyor belt, the bulk material carried thereon is caused to fall by gravity down each side of the conveyor into suitable receptacles positioned at the selected discharge station.

In the embodiments of the invention herein specifically described, the discharge members are in the form of crown-faced or semi-elliptical rollers positioned between the conventional troughing idling rollers. In normal operation the base of the trough-shaped conveyor rides along the troughing idlers and central peak of the discharge rollers. To effect material discharge, as in one embodiment of the invention, the discharge roller is raised against the conveyor to cause the conveyor to assume an inverse trough-shaped configuration with the central apex of the conveyor being created by the action thereon of the increased diameter central region of the discharge roller.

To increase the efficiency of material discharge at the selected discharge stations, the belt may also be agitated or vibrated such as by providing some eccentric rotational movement to the discharge roller and/or by providing an uneven, e.g., ribbed, peripheral surface to a portion of the discharge roller belt-engaging surface.

To the accomplishment of the above and to such further objects as may hereinafter appear, the present invention relates to a belt conveyor discharge device substantially as defined in the appended claims and as described in the following specification taken together with the accompanying drawings in which:

FIG. 1 is a side elevation in schematic form of the conveyor discharging apparatus of the invention in accordance with one embodiment thereof;

FIG. 2 is a top plan view of the apparatus of FIG. 1;

FIG. 3 is a sectional view in elevation on an enlarged scale relative to FIGS. 1 and 2, showing in greater detail the conveyor apparatus of the embodiment of FIGS. 1 and 2;

FIG. 4 is an end elevation partly in section of the apparatus of FIG. 1, as viewed in the direction of the arrows 4—4 in FIG. 2, illustrating the crowned discharge roller in its normal and its material discharging positions;

FIG. 5 is an end elevation illustrating the slight off-center or eccentric mounting of the discharge roller in accord with one feature of the invention;

FIG. 6 is a side elevation partly broken away of a discharge roller used in the apparatus of the invention illustrating the ribbed peripheral surface of the roller;

FIG. 7 is an end elevation of the ribbed roller of FIG. 6;

FIG. 8 is a side elevation in partial section illustrating an alternative embodiment of the invention in its normal position;

FIG. 9 is a view similar to that of FIG. 8 but showing the conveyor apparatus in the material discharging position, and;

Figure 10:
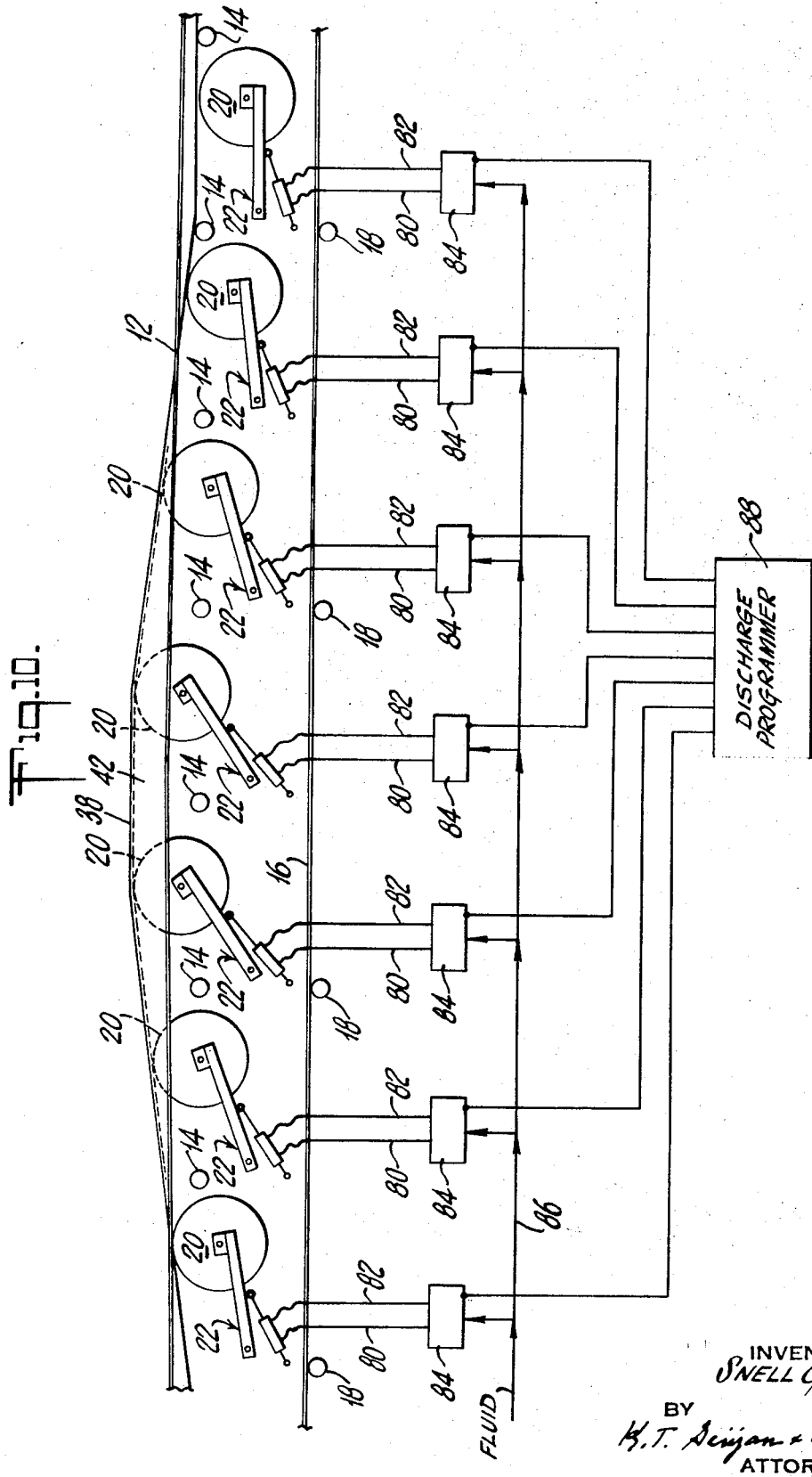
FIG. 10 is a view similar to that of FIG. 1 illustrating a typical programming system for the automatic control of the discharge apparatus of the invention.

In the conveyor apparatus of the invention, bulky material is carried on the upper longitudinal surface of a troughed belt conveyor. Crown-faced or elliptical-like rollers are positioned intermediate the troughing idlers, but beneath the belt at selected locations or stations at which it may be desired to selectively discharge the material from the conveyor into an adjacently arranged receptacle or to an adjacently arranged moving conveyor, guide chutes being preferably employed to guide the discharged material to its destination. To effect material discharge, the crown roller is preferably caused to move vertically with respect to the belt conveyor to thereby invert the conveyor belt in a manner such that the longitudinal central region of the belt is raised above its side regions. In the raised condition of the conveyor belt, material carried thereon falls under the influence of gravity down the sloping surfaces of the belt into guide chutes or receptacles located alongside the conveyor.

Referring now to FIG. 1, there is shown in schematic form, an endless conveyor belt 10 having an upper flight 12 carried on a series of spaced stationary troughing idlers 14, and a lower flight 16 supported by a plurality of spaced return idlers 18. Conveyor belt 10 is formed of a flexible but sturdy material such as a rubber composition having a number of reinforcing cotton plies therein to increase the maximum stress that can be handled by the belt. The conveyor belt is caused to move in a known manner between a material loading point and a head by means of a rotating drive pulley (not shown) located at the head of the conveyor. The opposite end of the conveyor belt passes over a tail or take-up pulley (also not shown).

In accord with the present invention, selectively actuated discharge means in the form of simple crown-faced or elliptical-like rollers 20 are arranged along the length of the conveyor intermediate the troughing idlers 14. Each roller 20 is coupled to an actuating mechanism generally designated 22 which when actuated raises its associated discharge roller to raise only the central region of the conveyor above its side regions and cause material to discharge in the manner described above.

As seen best in FIG. 3 and also in FIG. 4, each set of troughing idlers 14 comprises three idlers 26, 28 and 30 suitably rotatably mounted on central shafts 32 supported at their ends in bearing housings 34. The latter are in turn supported by brackets 36. Central idler 28 is substantially horizontal and the two side idlers 26 and 30 incline upwardly and outwardly away from the ends of idler 28 to define a trough-like configuration for the upper flight of the conveyor, in which a horizontal central region 38 and two upwardly inclining longitudinal side regions 40 and 42, communicating at their inboard lower ends with the central region, 38 are defined.

Roller 20 has a maximum diameter at its central portion or crown 44 which, when roller 20 is in its normal or non-discharge position as indicated by the solid line position of the roller shown in FIG. 3, supports the horizontal central region 38 of the conveyor at those locations of the conveyor intermediate the central troughing idlers 28. As a result, when not in a discharge position (that is, when in a home position), the discharge rollers contribute to the guidance of the conveyor. In this position of the discharge roller, no other peripheral portion of the discharge roller is contacted by the conveyor belt.

Upon the operation of the actuating mechanism 22, which is described more completely in a later portion of the specification, discharge roller 20 is raised to the discharge position shown by the broken line view of the roller in FIG. 4. When roller 20 is thus elevated, flexible conveyor 10 is engaged and raised along with roller 20 to the position indicated at 10a, in which as shown, the trough-like configuration of the conveyor belt is inverted, that is, central region 38 is now raised above the now downwardly sloping side regions 40 and 42 and forms an apex of approximately 90°. Bulk material 24 carried on the upper flight of the conveyor at this time falls by gravity down the sloping side regions 40 and 42 and into the receptacles or bins 46 or chutes located alongside the conveyor.

The discharge roller 20, which is preferably fabricated from a light-weight material such as aluminum, is supported by a pivotably mounted carriage assembly. The assembly as seen best in FIGS. 1, 2, and 4, comprises a transverse arm 48 to which actuating mechanism 22 is coupled. Lever arms 50 and 52 are secured to the opposite ends of transverse arm 48 and are pivotably mounted at 54 to a support rail 56 extending along the length of the conveyor. Bearing housings 58 are carried by lever arms 50 and 52 near their upper ends and receive therein the ends of a shaft 60 to which discharge roller 20 is secured.

In the embodiment of the invention herein described, actuating mechanism 22 is hydraulically operated and comprises a cylinder 62 having its lower end pivotably secured at 64 to a fixed support 66. A piston 68 is movable within cylinder 62 and is pivotably connected at its upper end by a linkage 70 to transverse arm 48. To raise discharge roller 20 to its material discharging position, hydraulic fluid is introduced under pressure into cylinder 62 as will be more completely described below with reference to FIG. 10. Piston 68 is thus moved out from the cylinder which motion is transferred to the discharge roller carriage assembly by the coupling between piston 68 and transverse arm 48. To return the discharge roller to its normal or non-discharging position, hydraulic fluid is removed from the cylinder and the piston, carriage assembly and discharge roller are all thereby returned to their normal positions.

To increase the efficiency of material removal from the conveyor when the discharge roller is raised to its discharge position, a triangular brush or plow 72 (FIG. 4) is positioned at each unloading station above the upper flight of the conveyor, has its apex substantially aligned with the crown 44 of the discharge roller, and conforms generally to the inverted trough shape of the conveyor belt when the latter is raised and inverted upon the operation of the discharge roller. The bulk material carried on the conveyor belt, and particularly that material carried at the apex of the inverted belt, contacts brush 72 and is thereby caused to be pushed off the apex of the conveyor belt onto the downwardly sloping side regions of the inverted belt and into the receptacles.

To further increase the efficiency of material discharge, the bulk material may also be subjected to agitation to thereby reduce the amount of bulk material that adheres to the surface of the belt conveyor. To this end, as shown in FIG. 5, shaft 60 may be mounted slightly eccentrically with respect to the longitudinal axis of the discharge roller which causes the roller to oscillate periodically in the vertical direction when it rotates to thereby introduce a rocking action to the belt. In addition, as shown best in FIGS. 6 and 7, the discharge roller 20 may have a number of axial ribs 74 formed on its outer surface which extend from each axial and of the roller and terminate near the central region of the roller which is thus free of the ribs. The ribs produce a vibration of the downwardly sloping conveyor end regions 40 and 42 when the conveyor is in its inverted, discharge position with the desired result of promoting increased material discharge from the belt.

To assure cleanliness of operation, a dust cover housing or hood 76 having access panels formed therein may be placed around the entire conveyor assembly to prevent dust and particles from escaping into the surrounding areas.

An alternate version of the invention is illustrated in FIGS. 8 and 9 in which the conveyor, as in the first described embodiment, is normally supported on its upper flight by the crown of the discharge roller and the troughing rollers arranged to normally form the flexible conveyor into a trough-like configuration, as shown in FIG. 8.

In a discharge operation, instead of raising the discharge roller 20 to invert the trough-like configuration of the conveyor as in the previously described embodiment, the roller 20 remains fixed and the troughing idlers are lowered as shown in FIG. 9, so that the conveyor belt is supported only by the discharge rollers, at which time the belt assumes the shape of the discharge roller, to wit, an inverted trough having a raised apex and downwardly sloping side regions similar to that achieved in the operation of the previously described embodiment.

The discharge roller 20 in the embodiment of FIGS. 8 and 9 is rotatably mounted on a support bracket 78 fixedly mounted on rail 54. The troughing rollers 14 in this embodiment are carried on a vertically movable bracket 80 which is selectively raised or lowered by a suitable mechanism such as a hydraulic or an electrical lifting device, the design of which is well within the skill of those skilled in the art, and which is thus not further described herein.

The conveyor apparatus of the present invention thus has the capability of selectively discharging material carried thereon at any one of a number of unloading stations positioned along the conveyor path with a relatively low-cost and relatively uncomplicated and reliable mechanism. Significantly, the discharging mechanism of the invention provides optimum material discharge while producing minimum wear on the conveyor belt material, thereby reducing the frequency of belt replacement and conveyor shut-down.

If desired, the discharge mechanism can be readily operated under the control of a preset program to automatically achieve material discharge in accordance with a predetermined schedule or sequence as shown in the schematic diagram of FIG. 10. As therein illustrated, each of cylinders 62 is connected by a fluid inlet conduit 80 and a fluid outlet conduit 82 to a solenoid valve 84. Valve 84 in turn receives a supply of fluid such as compressed air at a fluid supply line 86 and a solenoid control signal received from a discharge programmer 88. The latter is preset to supplying control signals to the solenoid valves in a predetermined sequence and at preset times to automatically operate the valves 84 in that sequence, to in turn cause actuation of the discharge rollers 20 in the manner described above. Programmer 88 may be one of the several electrical, mechanical, or electromechanical devices well known in the art such as a mechanical timing mechanism or a digital unit operating in response to a punched tape or card, to actuate the solenoid valves and thus the discharge rollers in the desired sequence. Since the design and manner of operation of such devices is well within the skill of those skilled in the art, no further description of programmer 88 is believed to be necessary herein.

While the discharge mechanism employed has been herein specifically described in the form of a hydraulically controlled apparatus, it will be apparent that other means such as electrically controlled jacks and other electrical or mechanical devices could be employed to equal advantage.

Thus, while only two embodiments of the invention have been herein specifically described, it will be apparent that variations may be made therein without departing from the spirit and scope of the invention.

I claim:

1. A conveying system for carrying and discharging bulk material therefrom which comprises, an endless resilient conveyor belt of predetermined width comprising an upper flight portion for carrying bulk material along a predetermined path and a lower flight return portion, troughing idlers disposed below said upper flight portion and spaced longitudinally therealong in supporting engagement with said upper flight portion when carrying bulk material, a plurality of elliptical-like discharge rollers characterized by an enlarged crown portion and reduced end portions disposed beneath said upper flight portion with the rollers alternately spaced between said troughing idlers, the axis of rotation of said discharge rollers being disposed transverse to said belt, with the axial length of each roller corresponding substantially to the width of the belt, means cooperatively associated with each of said discharge rollers for effecting the vibration of said belt at said predetermined region when the said at least one discharge roller is in contact with the upper flight portion of said belt, and means for effecting relative vertical displacement as between said upper flight portion and at least one selected discharge roller at a predetermined region of the belt, whereby said at least one selected discharge roller is caused to bear against the bottom of said upper flight portion of the belt and cause the belt to assume an inverted trough across the width thereof so as to discharge the bulk material therefrom at said predetermined region during movement of said belt.

2. The conveying system of claim 1, wherein each of said discharge rollers is supported in home position out of contact with said belt by support means capable of being actuated to elevate at least one selected discharge roller upwardly against the bottom of said belt and cause the upper flight portion of said belt to assume an inverted trough, and including means for actuating said support means for elevating said at least one selected discharge roller against the belt, whereby to effect discharge of said bulk material at said predetermined region.

3. The conveying system of claim 2, wherein the means for actuating the support means for elevating the at least one discharge roller includes a timing device for selectively causing the elevation of said at least one discharge roller in accordance with a predetermined sequence.

4. The conveyor system of claim 1, wherein the vibration means is provided by employing a discharge roller having an uneven peripheral surface formed about a portion of said discharge roller.

5. The conveyor system of claim 1, wherein the vibration means comprises means for eccentrically rotating said at least one discharge roller.

6. A conveying system for carrying and discharging bulk material therefrom which comprises, an endless resilient conveyor belt of predetermined width comprising an upper flight portion for carrying bulk material along a predetermined path and a lower flight return portion, troughing idlers disposed below said upper flight portion and spaced longitudinally therealong in supporting engagement with said upper flight portion when carrying bulk material, a plurality of elliptical-like discharge rollers characterized by an enlarged crown portion and reduced end portions disposed beneath said upper flight portion with the rollers alternately spaced between said troughing idlers, the axis of rotation of said discharge rollers being disposed transverse to said belt, with the axial length of each roller corresponding substantially to the width of the belt, each of said discharge rollers being supported in home position out of contact with the upper flight portion of said belt by support means capable of being actuated to elevate at least one selected discharge roller upwardly against the bottom of said belt and cause the upper flight portion of said belt to assume an inverted trough at a predetermined region of the belt, and including means for actuating said support means for elevating said at least one selected discharge roller against the belt, whereby to effect discharge of said bulk material at said predetermined region, and means positioned along said predetermined path and spaced above the upper flight portion of said belt for contacting a portion of the bulk material during elevation of the belt when the selected at least one discharge roller is in material-discharging position whereby to aid in the discharge of said material.

7. The conveyor system of claim 6, wherein each of said discharge rollers has cooperatively associated therewith means for effecting the vibration of said belt at said predetermined region when the said at least one discharge roller is in contact with the upper flight portion of said belt.

8. The conveyor system of claim 7, wherein the vibration means is provided by employing a discharge roller having an uneven peripheral surface formed about a portion of said discharge roller.

9. The conveyor system of claim 7, wherein the vibration means comprises means for eccentrically rotating said at least one discharge roller.

* * * * *